United States Patent
Tu et al.

(10) Patent No.: US 6,735,442 B2
(45) Date of Patent: May 11, 2004

(54) METHOD FOR DETECTING AND CONTROLLING A STANDBY MOBILE PHONE

(75) Inventors: Biqin Tu, Shenzhen (CN); Wensheng Qiu, Shenzhen (CN)

(73) Assignee: Zte Corporation, Shenzehn (CN)

( * ) Notice: Subject to any disclaimer, the term of this patent is extended or adjusted under 35 U.S.C. 154(b) by 486 days.

(21) Appl. No.: 09/772,993

(22) Filed: Jan. 31, 2001

(65) Prior Publication Data

US 2002/0037721 A1 Mar. 28, 2002

(30) Foreign Application Priority Data

Sep. 26, 2000 (CN) ........................... 00125401 A

(51) Int. Cl.$^7$ ................................. H04Q 7/20
(52) U.S. Cl. .................. 455/434; 455/436; 455/435.2; 455/515
(58) Field of Search ................. 455/434–436, 455/524–525, 515, 574, 420

(56) References Cited

U.S. PATENT DOCUMENTS

| | | | | |
|---|---|---|---|---|
| 5,778,316 A | * | 7/1998 | Persson et al. | 455/434 |
| 5,896,376 A | * | 4/1999 | Alperovich et al. | 370/348 |
| 6,067,460 A | * | 5/2000 | Alanara et al. | 455/574 |
| 6,178,326 B1 | * | 1/2001 | Kalliokulju | 455/437 |
| 6,434,389 B1 | * | 8/2002 | Meskanen et al. | 455/437 |
| 6,546,251 B1 | * | 4/2003 | Dalsgaard et al. | 455/437 |
| 2002/0032032 A1 | * | 3/2002 | Haumont et al. | 455/436 |

* cited by examiner

*Primary Examiner*—William Trost
*Assistant Examiner*—Sharad Rampuria
(74) *Attorney, Agent, or Firm*—Arent Fox PLLC

(57) ABSTRACT

The invention relates a method for detecting and controlling a standby mobile phone, including the steps: simulating the function of a standby mobile phone and selecting current service cell; monitoring and recording the system information and the system signal strength of the current cell; selecting a frequency as a new frequency; monitoring and recording the Base Station Identity Code (BSIC); analyzing and amending the system information; transmitting the pseudo-system information and the amended BSIC; the standby mobile phone receiving and analyzing the pseudo-system information and the amended BSIC; the standby mobile phone voluntarily requesting to establish a radio link connection; and the standby mobile phone being granted to access and establish the requested radio link connection, thereafter the phone being controlled. According to the method of the invention, a standby mobile phone can be accurately detected and controlled in those sensitive points so as to eliminate the influence of the radio signals produced by the standby mobile phone. This method may record the standby phone number.

8 Claims, 2 Drawing Sheets

METHOD FOR DETECTING AND CONTROLLING A STANDBY MOBILE PHONE

FIELD OF THE INVENTION

The present application relates to mobile communication, in particularly to a method for detecting and controlling a standby mobile phone.

BACKGROUND OF THE INVENTION

Recently, as rapid development of economy, the number of subscribers of mobile phone is significantly increasing. The high-tech mobile communication has provided great convenience to people. However, some points or sites such as radar stations, astronomic radio telescopes, airplanes, which are sensitive to the strong radio signal are negatively influenced. For instance, a mobile phone in working-state will produce strong radio signals which interfere with the navigation of an airplane even the phone is in standby state. In fact, the interference from the mobile phone is always a big problem to be solved by the civil aviation authorities in many countries. Up till now, no means or instruments are provided to solve the problem effectively. Therefore, it is a need to develop a method for detecting a standby mobile phone in those sensitive points and controlling the detected phone.

An object of the present invention is to provide a method for detecting and controlling a standby mobile phone. According to the method of the invention, a standby mobile phone can be accurately detected and controlled in those sensitive points so as to eliminate the influence of the radio signals produced by the standby mobile phone. This method may record the standby phone number.

SUMMARY OF THE INVENTION

According to the invention, a method for detecting and controlling a standby mobile phone, comprising the following steps:

(1) simulating the function of a standby mobile phone and selecting current service cell;
(2) monitoring and recording the system information and the system signal strength of the current cell;
(3) selecting a frequency from a Broadcast Control Channel (BCCH) frequency-list of an adjacent cell as a new frequency;
(4) monitoring and recording the Base Station Identity Code (BSIC) issued in a Synchronization Channel (SCH) according to said new frequency;
(5) analyzing and amending the system information obtained in step (2) and the BSIC recorded in step (4), wherein the amended system information is called as pseudo-system information;
(6) transmitting the pseudo-system information in the Broadcast Control Channel (BCCH) and the amended BSIC in synchronization channel (SCH) according to the new frequency obtained in step (3);
(7) the standby mobile phone receiving and analyzing the pseudo-system information and the amended BSIC;
(8) the standby mobile phone voluntarily requesting to establish a radio link connection; and
(9) the standby mobile phone being granted to access and establish the requested radio link connection, thereafter the phone being controlled.

Said current system information monitored and recorded in step (2) includes the cell identity, the location area identity, the BCCH frequency list of an adjacent cell, the cell reselection parameters (including cell reselection offset parameter) and the maximum power level of the control channel. The pseudo-system information in step (5) includes the cell identity, the location area identity, the cell reselection parameters (including cell reselection offset parameter) and the maximum power level of the control channel.

When step (3) is performed, it is best to select a frequency from an adjacent cell with the weakest signal strength as a new frequency.

The signal strength for transmitting the pseudo-system information and the amended BSIC in step (6) are calculated by using the cell selection and reselection equations and physics equations according to controlling radius and network signal strength.

After a standby mobile phone is under the control, several controlling modes will be proceeding with in view of the controlled standby mobile phone.

Mode I (1) the standby mobile phone transmits a Location Updating Request in a Stand-alone Dedicated Control Channel (SDCCH);
(2) the standby phone is inquired about its identity in the SDCCH;
(3) the phone transmits its own identity in the SDCCH in responding to the inquiring; and
(4) the phone's International Mobile Station Identity (IMSI) and International Mobile Equipment Identification (IMEI) and Temporary Mobile Subscriber Identity (TMSI) are recorded.

Mode II (1) the standby phone transmits a Location Updating Request; and
(2) the Location Updating Request transmitted by the standby phone is refused on the basis of the mobile phone is deemed illegal, so that the phone is disabled temporarily.

Mode III (1) the standby mobile phone transmits a Location Updating Request in a SDCCH;
(2) the standby phone is inquired about its identity in the SDCCH;
(3) the phone transmits its own identity in the SDCCH in responding to the inquiring;
(4) the phone's International Mobile Station Identity (IMSI), International Mobile Equipment Identification (IMEI) and Temporary Mobile Subscriber Identity (TMSI) are recorded; and
(5) the Location Updating Request transmitted by the standby phone is accepted and the standby phone receives a Paging signal to ring; alternatively, the Location Updating Request is refused on the basis of the mobile phone is deemed illegal so that the phone is disabled temporarily.

DETAILED DESCRIPTION OF THE INVENTION

The below is to describe the method of the invention in detail accompanying with the appended drawings.

Figure 2:
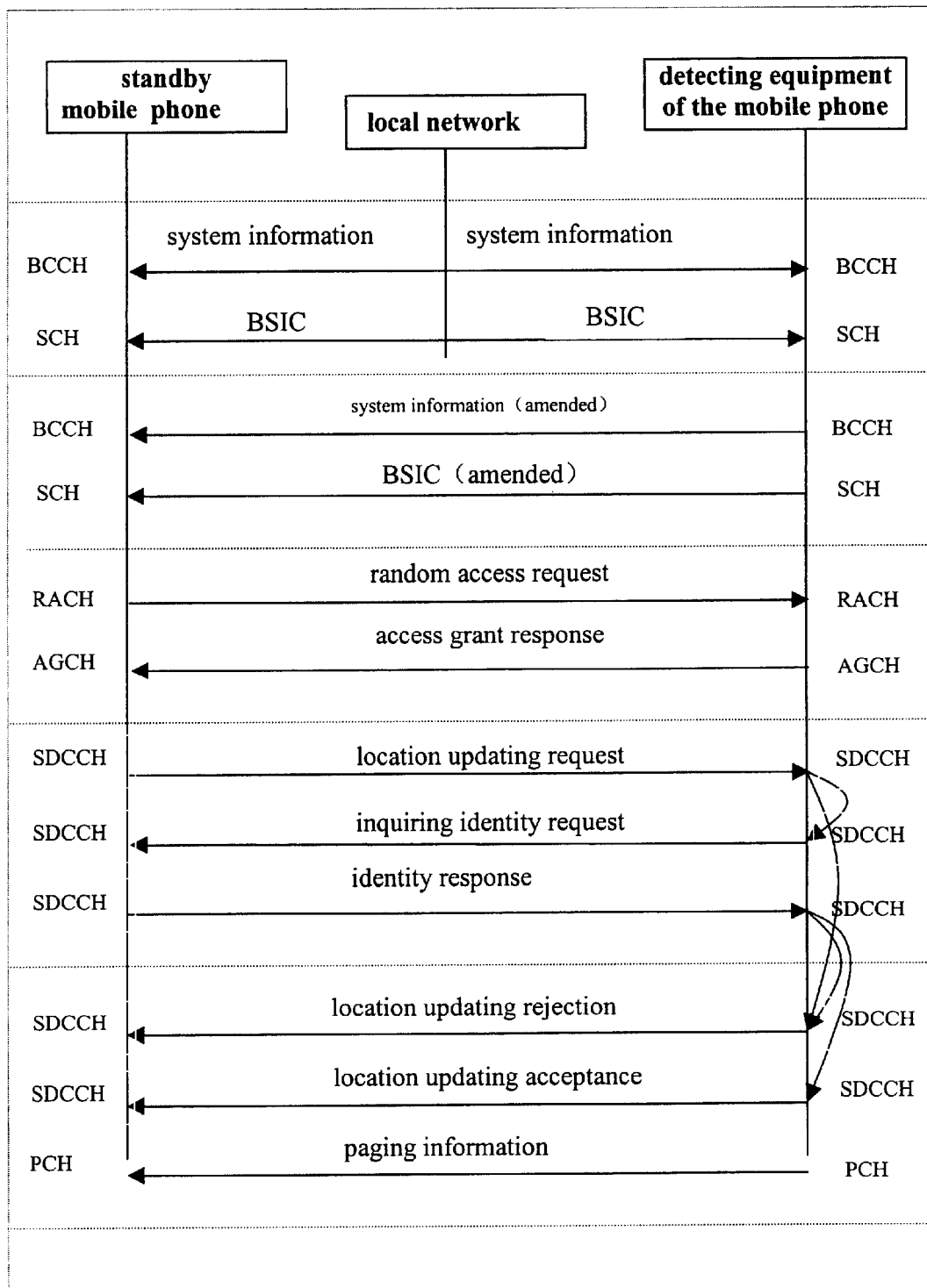
FIG. 2 is a message sequence chart of detecting and controlling a standby mobile phone.

In FIG. 2, BCCH means a Broadcast Control Channel. SCH means a Synchronization Channel. RACH means a Random Access Channel. AGCH means an Access Grant Channel. SDCCH means Stand-alone Dedicated Control Channel. PCH means a Paging Channel. The function of a mobile phone detection apparatus as shown in FIG. 2 may be implemented by simulating the relevant functions of a mobile phone, a base station subsystem (BSS) and a mobile switching center (MSC).

Figure 1:
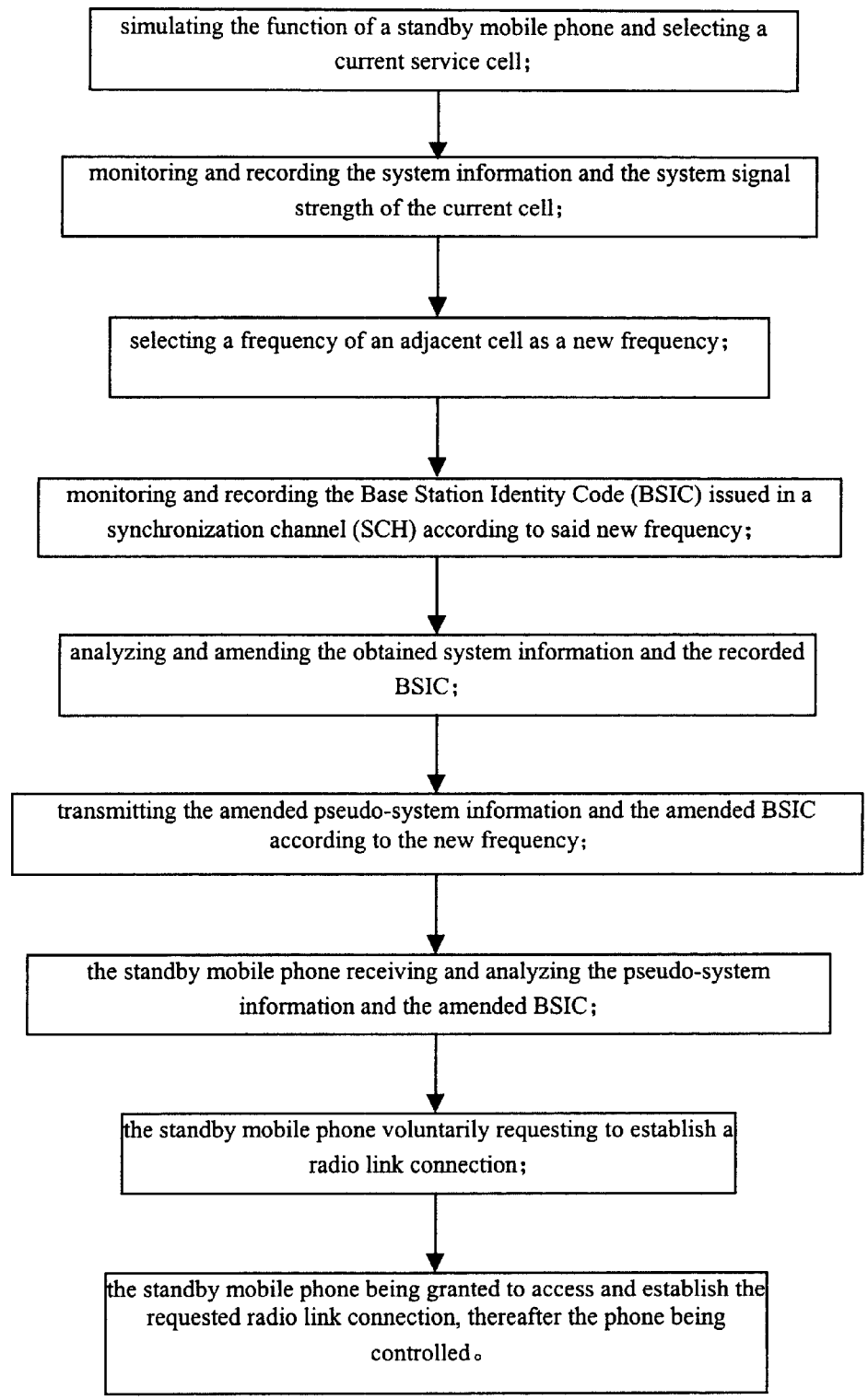
FIG. 1 is a processing flow chart of detecting and controlling a standby mobile phone.

As shown in FIGS. 1 and 2, the first step is performed by simulating a mobile phone to select a current serving cell. This step can be practically carried out by simulating the radio resource management of the phone. Then, the system information and the system signal strength of the selected current cell are monitored and recorded. The information to be recorded includes the cell identity, location area identity, the BCCH frequency list of an adjacent cell, cell reselection parameters (including cell reselection offset parameter), and the maximum power level of the control channel. In order to enhance the accuracy of the pseudo system information, all information of the current service cell may be recorded.

The third step is to select a frequency from the broadcast control channel (BCCH) frequency list of an adjacent channel as a new frequency. The new frequency is usually selected from such a cell whose signal strength is weakest. In this way, it is possible to transmit the pseudo-system information and BSIC in a lowest transmission power, because the transmission power is relevant to the signal strength of the cell to be selected. The fourth step is to monitor and record the BSIC transmitted in Synchronization Channel according to the new frequency. In the fifth step, the system information recorded in step (2) and the BSIC recorded in step (4) are analyzed and amended. The amended system information (called pseudo-system information) includes the cell identity, the location area identity, the cell reselection parameters (including cell reselection offset parameter) and the maximum power level of the control channel. The purpose for amending the cell reselection offset parameters CELL_RESELECT_OFFSET is to enhance the priority level of a cell reselection so that all mobile phone in the coverage area can be attracted with lower signal strength which may be lower than the currently mobile network signal strength. Since the BSIC of the phone detection apparatus is different from that of the base station with the same BCCH frequency, the existing network cannot be interfered. The amendments to the maximum power level of the control channel MS_TXPWR_MAX_CCH is to make the access power of a phone as low as possible so that the interference produced by the signals of a phone is reduced at the very first stage.

At the sixth step, according to the new frequency, the pseudo-system information is transmitted in the Broadcast Control Channel and the amended BSIC is transmitted in the synchronization channel. This function may be implemented by simulating the radio resource management of the base station subsystem. The signal strength for transmitting the pseudo-system information and the amended BSIC may be accurately calculated by means of some physic equations and some mobile communication protocol which has pre-scribed some equations for selecting a cell and for reselecting a cell based on the determined control radium and the existing network signal strength.

At the seventh step, the standby mobile phone receives the pseudo-system information and the amended BSIC and analyzes the same. As the cell identity and location area identity in the received pseudo-system information and the BSIC have already been changed and the priority level of the cell reselection is relatively higher according to the received pseudo-system information, the standby phone will consider it is a suitable base station transceiver (DT3) and thus, the phone will perform the location updating procedure. Before the location updation, the phone should establish a radio link connection. So, in the eighth step, the standby mobile phone voluntarily requests to establish a radio link connection. The phone sends a Random Access Request in the Random Access Channel. At the ninth step, the standby phone is granted to access and establish a radio link connection. In this condition, the standby phone is under the control. An Access Grant Response is transmitted to the controlled standby phone in the Access Grant Channel so as to establish a radio link connection. This function may be implemented by simulating the radio resource management in the base station subsystem.

After the radio link connection has been established, the phone will be controlled through a lot of ways matching different purposes. For instance, the phone's number can be recorded, the phone can be disabled temporarily, the phone's number is recorded then the phone is disabled, or the phone's number is recorded and the ring is initiated, etc.

As shown in FIG. 2, after the radio link connection has been established, the standby phone transmits a Location Updating Request in the allocated SDCCH. If it is necessary to record the phone number, the identity requests of the IMSI (International Mobile Station Identity, namely SIM number), IEI (International Mobile Equipment Identity, namely mobile phone number) and TMEI (Temporary Mobile Station Number) are transmitted to the phone concerned for inquiring the number. This function may be implemented by simulating the Mobility Management in the Mobile Switching Center (MSC) and the radio resource management in the base station subsystem (BSS). After receiving a signaling for inquiring the number, the phone sends a response in the SDCCH to report its own IMSI, IMEI and TMSI. If not necessary to record the phone number, the phone can be disabled temporarily. In this way, a signaling for refusing the location updating request is transmitted to the phone and the phone is deemed illegal MS. Without transmitting any radio signals, the disabled phone will not produce any interference over those sensitive apparatus. Once the standby phone leaves the defined area, it will be restored. This function may be implemented by simulating the Mobility Management in the Mobile Switching Center (MSC) and the Radio Resource management in the Base Station Subsystem (BSS).

When the IMSI, IMEI and TMSI of a standby mobile phone are recorded, alternative control is to have the phone temporarily invalid or have the phone ring. If the phone is to ring, a signaling for accepting the location updating request should be transmitted in the SDCCH to the phone and then a paging information is sent in a PCH to the phone by using the recorded TMSI and IMSI so that the phone is to ring. If the phone is to be temporarily disabled, a signaling for refusing the location updating request is transmitted in SDCCH to the phone which is deemed to be illegal. Having the phone ring can be implemented by simulating the Mobility Management and Call Control of MSC and the Radio Resource management of the Base Station Subsystem.

According to the method, a standby mobile phone can be detected in those sensitive points and can be forced to ring by receiving a paging information. In this way, the subscriber of the phone is reminded of powering off his phone. In some urgent case, a standby phone can be temporarily disabled (it will be recovered and used normally when the urgent condition is vanished.). So, it is possible to eliminate any interference produced by the signals of a phone over those sensitive points or apparatus. In addition, by using the method according to the invention, a standby phone number will be recorded so that some subscribers with bad-faith will be tracked. The present invention can be easily implemented under the existing telecommunication circumstances and does not cause any negative influence to the existing network. Therefore, it is discerned that the present invention will have bright prospect.

What we claim is:

1. A method for detecting and controlling a standby mobile phone, comprising the steps of:
    (1) simulating the function of a standby mobile phone and selecting current service cell;
    (2) monitoring and recording the system information and the system signal strength of the current service cell;
    (3) selecting a frequency from a Broadcast Control Channel (BCCH) frequency-list of an adjacent cell as a new frequency;
    (4) monitoring and recording a Base Station Identity Code (BSIC) issued in a Synchronization Channel (SCH) according to said new frequency;
    (5) analyzing and amending the system information obtained in step (2) and the BSIC recorded in step (4), wherein the amended system information is pseudo-system information;
    (6) transmitting the pseudo-system information in the BCCH and the amended BSIC in Synchronization Channel (SCH) according to the new frequency obtained in step (3);
    (7) the standby mobile phone receiving and analyzing the pseudo-system information and the amended BSIC;
    (8) the standby mobile phone voluntarily requesting to establish a radio link connection; and
    (9) the standby mobile phone being granted to access and establish the requested radio link connection, and being controlled via said radio link connection.

2. A method as claimed in claim 1, wherein the current system information monitored and recorded in step (2) includes the cell identity, the location area identity, the BCCH frequency list of an adjacent cell, the cell reselection parameters and the maximum power level of the control channel.

3. A method as claimed in claim 1, wherein the new frequency is selected from such a cell whose signal strength is weakest.

4. A method as claimed in claim 1, wherein the amended system information in step (5) includes the cell identity, the location area identity, the cell reselection parameters and the maximum power level of the control channel.

5. A method as claimed in claim 4, wherein the signal strength for transmitting the pseudo-system information and the amended BSIC in step (6) are calculated by using the cell selection and reselection equations and physics equations according to controlling radius and network signal strength.

6. A method as claimed in claim 1, wherein the control step (9) further includes the following steps:
    (1) the standby mobile phone transmitting a Location Updating Request in a Stand-alone Dedicated Control Channel (SDCCH);
    (2) the standby phone being inquired about its identity in the SDCCH;
    (3) the phone transmitting its own identity in the SDCCH in responding to the inquiring; and
    (4) the phone's International Mobile Station Identity (IMSI) and International Mobile Equipment Identification (IMEI) and Temporary Mobile Subscriber Identity being recorded.

7. A method as claimed in claim 1, wherein the control step (9) further includes the following steps:
    (1) the standby phone transmitting a Location Updating Request; and
    (2) the Location Updating Request transmitted by the standby phone being refused on the basis of the phone is deemed illegal, so that the phone is disabled temporarily.

8. A method as claimed in claim 6, wherein the control step (9)further includes the following steps:
    (1) the standby mobile phone transmitting a Location Updating Request in a SDCCH;
    (2) the standby phone being inquired about its identity in the SDCCH;
    (3) the phone transmitting its own identity in the SDCCH in responding to the inquiring;
    (4) the phone's International Mobile Station Identity (IMSI), International Mobile Equipment Identification (IMEI) and Temporary Mobile Subscriber Identity (TMSI) being recorded; and
    (5) the Location Updating Request transmitted by the standby phone being accepted and the standby phone receives a Paging signal to ring; alternatively, the Location Updating Request being refused on the basis of the subscriber is deemed illegal so that the phone is disabled temporarily.

* * * * *

UNITED STATES PATENT AND TRADEMARK OFFICE
CERTIFICATE OF CORRECTION

PATENT NO. : 6,735,442 B2
DATED : May 11, 2004
INVENTOR(S) : Tu et al.

It is certified that error appears in the above-identified patent and that said Letters Patent is hereby corrected as shown below:

<u>Title page,</u>
Item [73], Assignee, please correct the name and address of the Assignee to read as follows: -- ZTE Corporation, Shenzhen (CN) --

Signed and Sealed this

Seventh Day of September, 2004

JON W. DUDAS
*Director of the United States Patent and Trademark Office*